H. W. MILLAR.

Cheese Hoop.

No. 9,689. Reissued May 3, 1881.

*Witnesses:*
A. H. Norris.
J. A. Rutherford

*Inventor:*
Henry W. Millar,
By James L. Norris,
*Attorney.*

N. PETERS, Photo-Lithographer, Washington, D. C.

UNITED STATES PATENT OFFICE.

HENRY W. MILLAR, OF UTICA, NEW YORK.

CHEESE-HOOP.

SPECIFICATION forming part of Reissued Letters Patent No. 9,689, dated May 3, 1881.

Original No. 96,942, dated November 16, 1869. Application for reissue filed December 21, 1880.

*To all whom it may concern:*

Be it known that I, HENRY W. MILLAR, a citizen of the United States, residing at Utica, in the county of Oneida and State of New York, have invented a new and Improved Cheese-Hoop, of which the following is a specification.

My invention relates to devices for preventing the curd from being forced in between the edge of the follower of a cheese-hoop and the inner periphery of the hoop; and it consists, broadly, in the combination, with the follower of a cheese-hoop, of an expansible or elastic washer or ring arranged under the margin of said follower, and having its outer edge arranged to come in contact with the inner periphery of a cheese-hoop, whereby the action of the follower in the process of pressing cheese will cause said washer or ring to form a close joint with the hoop and the curd be prevented from entering between the hoop and the edge of the follower.

It consists, further, in the combination, with a cheese-hoop and its follower, of an expansible or elastic washer or ring arranged against the margin of the under side of the follower, with its edge arranged to come in contact with the hoop, and a similar ring arranged within and at the bottom of the hoop upon a press-board, whereby in the process of pressing cheese the curd is prevented from being forced in between the edge of the follower and the hoop or under the lower edge of the hoop.

Figure 1:
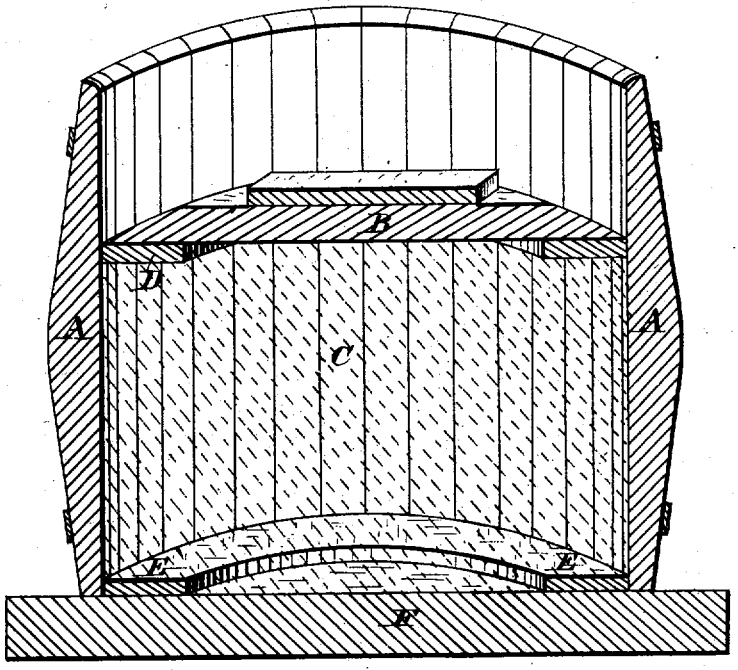
Figure 2:
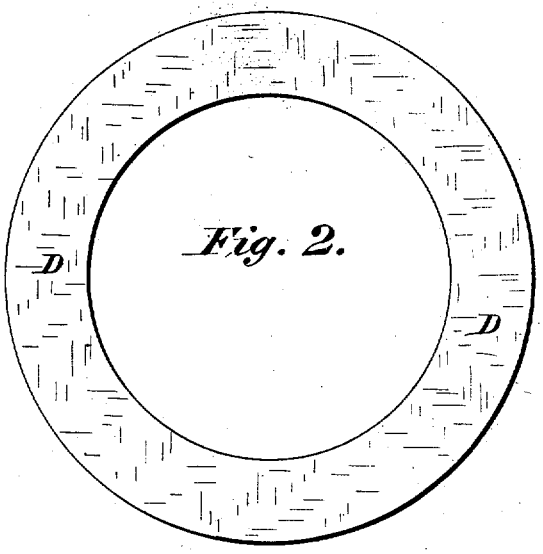

In the accompanying drawings, Figure 1 represents a vertical central section of a cheese-hoop, its follower, and expansible and elastic press rings or washers. Fig. 2 represents the expansible or elastic press ring or washer.

The letter A designates the cheese-hoop, and B the follower.

C indicates the cheese to be pressed.

D is a ring or washer, formed of india-rubber or similar elastic material capable of expanding when subjected to pressure. This expansible or elastic ring or washer is laid upon the top of the cheese, so as to come in contact with the margin of the under side of the follower, and to have its outer edge in contact with the inner periphery of the hoop.

When pressure is applied to the follower B it causes the washer or ring to expand and fit closely to the hoop A, thus preventing the curd from entering between the hoop and the edge of the follower.

By using the ring D the follower B may be made to fit loosely in the hoop, so as to be easily withdrawn. Frequently heretofore, in ordinary hoops and followers, it has been almost impossible to remove the follower, because of its swelling from being saturated with whey pressed out of the curd.

The letter E indicates another ring or washer, similar to ring D, which is placed under the cheese upon the press-board F, with its edge in contact with the hoop. This lower ring or washer forms a close joint with the hoop, and prevents the curd from being forced out between the lower edge of the hoop and the press-board.

The use of the two rings or washers obviates the use of two press-cloths, and thus saves considerable expense and labor.

Instead of the washers being made in the form of rings, they may be whole circular pieces—that is, the centers not being cut out to form rings. The thickness, of course, is not material, as that may vary with the size of the hoops.

What I claim is—

1. The combination, with the follower of a cheese-hoop, of an expansible or elastic washer or ring arranged under the margin of the said follower, and having its outer edge arranged to come in contact with the inner periphery of the cheese-hoop, substantially as described, whereby the action of the follower in the process of pressing cheese will cause said washer to expand and form a close joint with the interior of the hoop, and prevent the curd from entering between the hoop and the edge of the follower.

2. The combination, with a cheese-hoop and its follower, of an expansible or elastic washer or ring arranged against the margin of the under side of the follower, with its edge arranged to come in contact with the hoop, and a similar ring arranged within and at the bottom of the hoop upon a press-board, substantially as described.

In testimony whereof I have hereunto set my hand in the presence of two witnesses.

HENRY W. MILLAR.

Witnesses:

WILLIAM M. DAVIES,

J. R. CAMPBELL.